(12) United States Patent
Dai et al.

(10) Patent No.: US 12,196,948 B2
(45) Date of Patent: Jan. 14, 2025

(54) ELECTROSTATIC COMB DRIVE-BASED SILICON-BASED MEMS OPTICAL SWITCH AND N × N ARRAY

(71) Applicant: ZHEJIANG UNIVERSITY, Zhejiang (CN)

(72) Inventors: Daoxin Dai, Zhejiang (CN); Yi Sun, Zhejiang (CN); Huan Li, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 422 days.

(21) Appl. No.: 17/795,540

(22) PCT Filed: Mar. 1, 2021

(86) PCT No.: PCT/CN2021/078381
§ 371 (c)(1),
(2) Date: Jul. 27, 2022

(87) PCT Pub. No.: WO2022/062317
PCT Pub. Date: Mar. 31, 2022

(65) Prior Publication Data
US 2023/0103616 A1      Apr. 6, 2023

(30) Foreign Application Priority Data

Sep. 23, 2020   (CN) .......................... 202011009410.4

(51) Int. Cl.
*G02B 26/08*       (2006.01)
*G02B 6/35*        (2006.01)
(52) U.S. Cl.
CPC ....... *G02B 26/0841* (2013.01); *G02B 6/3518* (2013.01); *G02B 6/3546* (2013.01)
(58) Field of Classification Search
CPC . G02B 26/0841; G02B 6/3518; G02B 6/3546
(Continued)

(56) References Cited

U.S. PATENT DOCUMENTS

| 6,363,183 | B1* | 3/2002 | Koh ..................... G02B 6/3584 |
| | | | 385/16 |
| 7,054,519 | B1 | 5/2006 | Novotny |
| 2020/0041728 | A1 | 2/2020 | Spector et al. |

FOREIGN PATENT DOCUMENTS

| CN | 107329209 | 11/2017 |
| CN | 107678096 | 2/2018 |

(Continued)

OTHER PUBLICATIONS

"International Search Report (Form PCT/ISA/210) of PCT/CN2021/078381," mailed on Jun. 21, 2021, with English translation thereof, pp. 1-4.

*Primary Examiner* — William Choi
(74) *Attorney, Agent, or Firm* — JCIPRNET (57) ABSTRACT

An electrostatic comb drive-based silicon-based MEMS optical switch and an N×N array. The optical switch is primarily constituted by two parts, namely two separated crossing waveguide mirrors and an electrostatic comb driver. The crossing waveguide mirrors are constituted by two crossing waveguides and four adiabatic tapered waveguides. The electrostatic comb driver comprises an electrostatic comb, an island spring structure, and a transmission rod. The electrostatic comb is a pair of comb teeth structures, a voltage is applied to fixed comb teeth therein, and the other parts remain grounded. Under the effect of an electrostatic force, movable comb teeth move towards the fixed comb teeth, a spring distends and pushes via the transmission rod the movable crossing waveguide mirror to move towards the fixed crossing waveguide mirror, and the separated crossing waveguide mirrors are recombined into a complete crossing waveguide.

10 Claims, 6 Drawing Sheets

(58) Field of Classification Search
USPC ......... 359/212.1, 212.2, 213.1, 214.1, 221.1,
359/221.2, 224.1, 224.2, 225.1, 226.1,
359/290, 291
See application file for complete search history.

(56) References Cited

FOREIGN PATENT DOCUMENTS

| | | |
|---|---|---|
| CN | 108732687 | 11/2018 |
| CN | 110658584 | 1/2020 |
| CN | 112305676 | 2/2021 |

\* cited by examiner

ELECTROSTATIC COMB DRIVE-BASED SILICON-BASED MEMS OPTICAL SWITCH AND N × N ARRAY

CROSS-REFERENCE TO RELATED APPLICATION

This application is a 371 of international application of PCT application serial no. PCT/CN2021/078381, filed on Mar. 1, 2021, which claims the priority benefit of China application no. 202011009410.4, filed on Sep. 23, 2020. The entirety of each of the above mentioned patent applications is hereby incorporated by reference herein and made a part of this specification.

TECHNICAL FIELD

The disclosure relates to the field of integrated optoelectronic devices, in particular to a silicon-based waveguide MEMS optical switch and array, and in particular to an integrated silicon-based waveguide MEMS optical switch and array capable of controlling the movement of a crossing waveguide mirror through driving by an electrostatic comb, thereby regulating the transmission direction of light.

DESCRIPTION OF RELATED ART

With the accelerated application of new-generation information technologies such as 5G, Internet of Things, big data, and artificial intelligence, the scale of data center networks continues to expand. Large-scale warehouse-level data centers containing tens of thousands or even hundreds of thousands of servers are developing rapidly, and the data traffic has increased dramatically. It is urgent to develop a new generation of big data centers to provide strong support for the development of the digital economy. In response to this major demand, optical interconnection has rapidly emerged and has become a key technology for large-scale data centers, reflects the incomparable natural advantages of traditional electrical interconnection in terms of bandwidth and energy consumption, and provides an effective way to solving bottleneck issues such as bandwidth and energy consumption of data centers.

With the continuous expansion of the scale of the optical Internet and the increasingly complex architecture, how to further promote the routing and switching of the optical Internet on the basis of ultra-large capacity has become a key issue that needs to be solved urgently. Among the three conventional optical routing and switching manners, optical burst switching is the current mainstream switching manner, whose speed requirement is in the microsecond level, and has outstanding flexibility and high efficiency. For optical routing and switching, a large-scale N×N optical switch array is the core. Therefore, in recent years, domestic and foreign research institutions and researchers have attached great importance thereto, and gradually developed optical switch arrays with different materials, different principles, and different structures. Silicon photonics technology has outstanding advantages such as CMOS process compatibility, high integration, low cost, and easy large-scale integration, which provides an important platform for implementing a large-scale optical switch array. In recent years, a silicon-based optical switch and array have attracted much attention and made a series of important progress due to the huge development potential.

The MEMS have the unique ability to integrate electrical, mechanical, and optical elements on a single chip, and due to the micro/nano scale of such systems, the MEMS have different properties (low loss, switching speed, reliability, scalability, etc.) as compared to macro-scale systems. Currently, the MEMS optical switch has been used in communication networks that transmit large bandwidth data over long distances.

According to the optical signal propagation inside the switch, MEMS-based switches may be divided into two types: the free-space switch and the waveguide optical switch. In the free-space optical switch, an optical signal propagates in a free space and is directed towards the required output fiber along a path thereof. Here, the deflection of the optical path is most often implemented using a movable micromirror with a diameter of several hundreds of micrometers. On the other hand, in the waveguide optical switch, an optical signal is confined in a waveguide to propagate, and the switching of the optical path is implemented through adjusting the waveguide or a coupler to a specific position. A traditional 3D MEMS-based switch has good scalability (hundreds of input/output ports), low insertion loss, and low crosstalk, but longer switching time (a few milliseconds or tens of milliseconds). Currently, the MEMS-based waveguide optical switches are opening new ways to building all-optical switches. The MEMS-based waveguide optical switches can provide faster switching time (sub-microseconds or microseconds), lower insertion loss and crosstalk, and more input/output ports. Through special design, characteristics such as large bandwidth (adiabatic coupler) and polarization insensitivity can also be implemented. In the near future, the MEMS technology is still one of the key switching technologies for all-optical communication networks, and the MEMS-based waveguide optical switches may become the next generation of new optical switches.

SUMMARY

In view of the prior art, the objective of the disclosure is to provide a silicon-based waveguide MEMS optical switch and N×N array driven by an electrostatic comb. Through applying a voltage to fixed electrostatic comb teeth to control the movement of the movable comb teeth and drive a transmission rod to move, the distance between two crossing waveguide mirrors may be adjusted to achieve the effect of optical path switching or light splitting.

The technical solutions adopted in the disclosure are as follows.

The disclosure includes a silicon substrate and an electrostatic comb driver and two separated fixed crossing waveguide mirror and movable crossing waveguide mirror placed on the silicon substrate. The bottom of the fixed crossing waveguide mirror is fixedly placed on the silicon substrate through a silica under-cladding. The movable crossing waveguide mirror is connected to the electrostatic comb driver, and the movable crossing waveguide mirror is driven to move towards or away from the fixed crossing waveguide mirror by the electrostatic comb driver.

The fixed crossing waveguide mirror and the movable crossing waveguide mirror have the same structure and are both primarily constituted by a V-shaped broad waveguide and adiabatic tapered waveguides connected at two ends of the broad waveguide.

The fixed crossing waveguide mirror and the movable crossing waveguide mirror can be docked to form a complete crossing waveguide structure, and a single-mode curved waveguide and a single-mode straight waveguide are sequentially connected to each end of the broad waveguide of the fixed crossing waveguide mirror or the movable crossing waveguide mirror, so that adjacent optical switch units are connected, and the single-mode waveguides are used as input and output waveguides.

The electrostatic comb driver is primarily constituted by a pair of electrostatic comb teeth, a first island spring structure, a second island spring structure, and a transmission rod. The transmission rod is arranged along a moving direction of the movable crossing waveguide mirror. One end of the transmission rod is fixedly connected to the movable crossing waveguide mirror. The first island spring structure, the pair of electrostatic comb teeth, and the second island spring structure are sequentially disposed from the movable crossing waveguide mirror to the other end of the transmission rod. The first island spring structure and the second island spring structure have the same structure and both include four fixed islands and two folding springs. Two of the four fixed islands form one group to constitute two groups of fixed islands, the two groups of fixed islands are symmetrically distributed beside two sides of the transmission rod, and the two fixed islands in each group of fixed islands are arranged at intervals along the direction of the transmission rod. The bottom of the fixed island is fixedly placed on the silicon substrate through the silica under-cladding. Each side of the two groups of fixed islands is provided with the folding spring. Each folding spring is primarily constituted by a main rod and branch arms respectively fixedly connected to two ends and the middle of the main rod. The branch arms at the two ends of the main rod are respectively fixedly connected to side surfaces of the two fixed islands in one group of fixed islands, and the branch arm in the middle of the main rod is fixedly connected to a side surface of the transmission rod. The pair of electrostatic comb teeth are divided into fixed comb teeth and movable comb teeth. The fixed comb teeth and the movable comb teeth are equally divided into two parts symmetrically arranged on the two sides of the transmission rod. There is a gap without contact connection between the two parts of the fixed comb teeth and the transmission rod. The two parts of the movable comb teeth are respectively fixedly connected to two side surfaces of the transmission rod. Comb tooth portions of the fixed comb teeth and the movable comb teeth are oppositely arranged and in staggered distribution. The bottom of the fixed comb teeth is fixedly placed on the silicon substrate through the silica under-cladding.

The two parts of the fixed comb teeth are both connected to an external circuit. The external circuit applies a voltage to the fixed comb teeth to drive the movable comb teeth to move towards the fixed comb teeth, thereby driving the transmission rod and the movable crossing waveguide mirror connected thereto to move closer to the fixed crossing waveguide mirror until being connected to the fixed crossing waveguide mirror, and driving the folding springs in the two island spring structures to flexibly deform.

Through adjusting the magnitude of the voltage applied to the fixed comb teeth, the distance that the movable crossing waveguide mirror moves towards the fixed crossing waveguide mirror is regulated, and the distance between the two separated movable crossing waveguide mirror and fixed crossing waveguide mirror is adjusted, thereby implementing functions such as switching a light propagation path or light splitting of a silicon-based MEMS optical switch.

The main rod and the branch arms of the folding spring are all strip-shaped silicon, and the folding spring can be bent and deformed under the push of the transmission rod.

The electrostatic comb driver is a bistable electrostatic comb driver and is primarily constituted by an electrostatic comb tooth group, a third island spring structure, a fourth island spring structure, and a transmission rod. The transmission rod is arranged along the moving direction of the movable crossing waveguide mirror. One end of the transmission rod is fixedly connected to the movable crossing waveguide mirror. The third island spring structure, the electrostatic comb tooth group, and the fourth island spring structure are sequentially disposed from the movable crossing waveguide mirror to the other end of the transmission rod. The third island spring structure and the fourth island spring structure have the same structure and both include two fixed islands and bistable springs. The two fixed islands are symmetrically distributed on two sides of the transmission rod. The bottom of the fixed island is fixedly placed on the silicon substrate through the silica under-cladding. The two fixed islands are both connected to the transmission rod through the respective bistable springs. The electrostatic comb tooth group is divided into first fixed comb teeth, bilateral movable comb teeth, and second fixed comb teeth. The first fixed comb teeth, the bilateral movable comb teeth, and the second fixed comb teeth are equally divided into two parts symmetrically arranged on the two sides of the transmission rod. There is a gap without contact connection between the two parts of the first fixed comb teeth and the second fixed comb teeth and the transmission rod. Two parts of the bilateral movable comb teeth are respectively fixedly connected to two side surfaces of the transmission rod. The bilateral movable comb teeth is provided with comb tooth structures at two ends along the transmission rod. The comb tooth structures at the two ends of the bilateral movable comb teeth are respectively oppositely arranged and in staggered distribution with a comb tooth portion of the first fixed comb teeth and a comb tooth portion of the second fixed comb teeth. The bottoms of the first fixed comb teeth and the second fixed comb teeth are both fixedly placed on the silicon substrate through the silica under-cladding.

The two parts of the first fixed comb teeth or the second fixed comb teeth are both connected to an external circuit. The external circuit applies a voltage to one of the first fixed comb teeth or the second fixed comb teeth to drive the bilateral movable comb teeth to move towards the first fixed comb teeth or the second fixed comb teeth, thereby driving the transmission rod and the movable crossing waveguide mirror connected thereto to move closer to the fixed crossing waveguide mirror until being connected to the fixed crossing waveguide mirror, and driving the bistable springs in the two island spring structures to flexibly deform.

Through adjusting the magnitude of the voltage applied to the first fixed comb teeth or the second fixed comb teeth, the distance that the movable crossing waveguide mirror moves towards the fixed crossing waveguide mirror is regulated, and the distance between the two separated movable crossing waveguide mirror and fixed crossing waveguide mirror is adjusted, thereby implementing functions such as switching a light propagation path or light splitting of the silicon-based MEMS optical switch.

The bistable spring is primarily constituted by two curved strip-shaped silicon arranged in parallel. One end of the two strip-shaped silicon is fixedly connected to a side surface of one side of the fixed island, and the other end of the two strip-shaped silicon is fixedly connected to a side surface of the transmission rod. Deformation can occur under the push of the transmission rod.

An intersecting angle between two V-shaped branch parts of the broad waveguides in the movable crossing waveguide mirror and the fixed crossing waveguide mirror satisfies the critical condition of total reflection of mode light from silicon to air.

The fixed crossing waveguide mirror, the movable crossing waveguide mirror, and the electrostatic driver are all made of silicon materials and have the same thickness.

The fixed crossing waveguide mirror, the fixed island, and the fixed comb teeth used as fixed parts are connected to the silicon substrate through the silica under-cladding, and the rest of the electrostatic comb driver and the movable crossing waveguide mirror are all used as movable parts. The silica under-cladding is corroded by adopting corrosive gas such as hydrogen fluoride to form a cantilever beam structure.

The N×N optical switch array includes at least four cascaded silicon-based MEMS optical switches as described above.

Ports of the silicon-based MEMS optical switches of the adjacent former and latter stages are connected through a single-mode straight waveguide and a waveguide cross.

Taking two optical switches as one group, the four optical switches are divided into two groups. One of the output waveguides of the two optical switches in the former group of optical switches is respectively connected to one of the input waveguides of the two optical switches in the latter group of optical switches. The other one of the output waveguides of the two optical switches in the former group of optical switches is respectively connected to two ends of one side of the waveguide cross. The other one of the input waveguides of the two optical switches in the latter group of optical switches is respectively connected to two ends of the other side of the waveguide cross.

The optical switch array may adopt, but is not limited to, a Benes topology. For example, a cross-bar topology may also be used to form the array.

All materials involved in the disclosure basically have transparent properties in the optical communication waveband, that is, the material absorption loss only accounts for an extremely small part of the total loss. The entire optical switch structure or the arrayed optical switch structure may be manufactured by adopting monolithic integration.

The beneficial effects of the disclosure are as follows.

1. The structure is simple and the design is convenient, which can significantly reduce the manufacturing cost of the device.

2. No other material is introduced except for silicon waveguide, which is compatible with the CMOS process and may be manufactured by standard planar integrated optical waveguide process.

3. The switch mechanism adopts the principles of total reflection, electrostatic force, and bending deformation of the material, and the design is simple and easy to understand.

4. The unit device has low insertion loss, high extinction ratio, small wavelength sensitivity, large bandwidth, and large manufacturing tolerance.

5. By adopting electrostatic comb driving, especially bistable optical switching, the voltage only needs to be added when switching the state, so the required energy consumption is low.

6. The switch unit is in the form of 2×2 and may be cascaded to form an N×N optical switch array by adopting cross-bar, Benes, or other types of topological structures, which has very strong large-scale scalability.

In summary, the disclosure drives the separated crossing waveguide mirrors by adopting the electrostatic comb structure to implement the 2×2 optical switch and the N×N optical switch array with low loss, high extinction ratio, and large bandwidth, and has the advantages of simple structure, simple process, and superior performance.

In the drawings: 1—fixed crossing waveguide mirror, 2—movable crossing waveguide mirror, 3—transmission rod, 4—fixed island, 5—folding spring, 6—fixed comb teeth, 7—movable comb teeth, 8—bistable spring, 9—first fixed comb teeth, 10—bilateral movable comb teeth, 11—second fixed comb teeth, 12–silicon substrate, 13—silica under-cladding.

DETAILED DESCRIPTION OF DISCLOSED EMBODIMENTS

The disclosure will be further described below with reference to the drawings and the embodiments.

Figure 1:
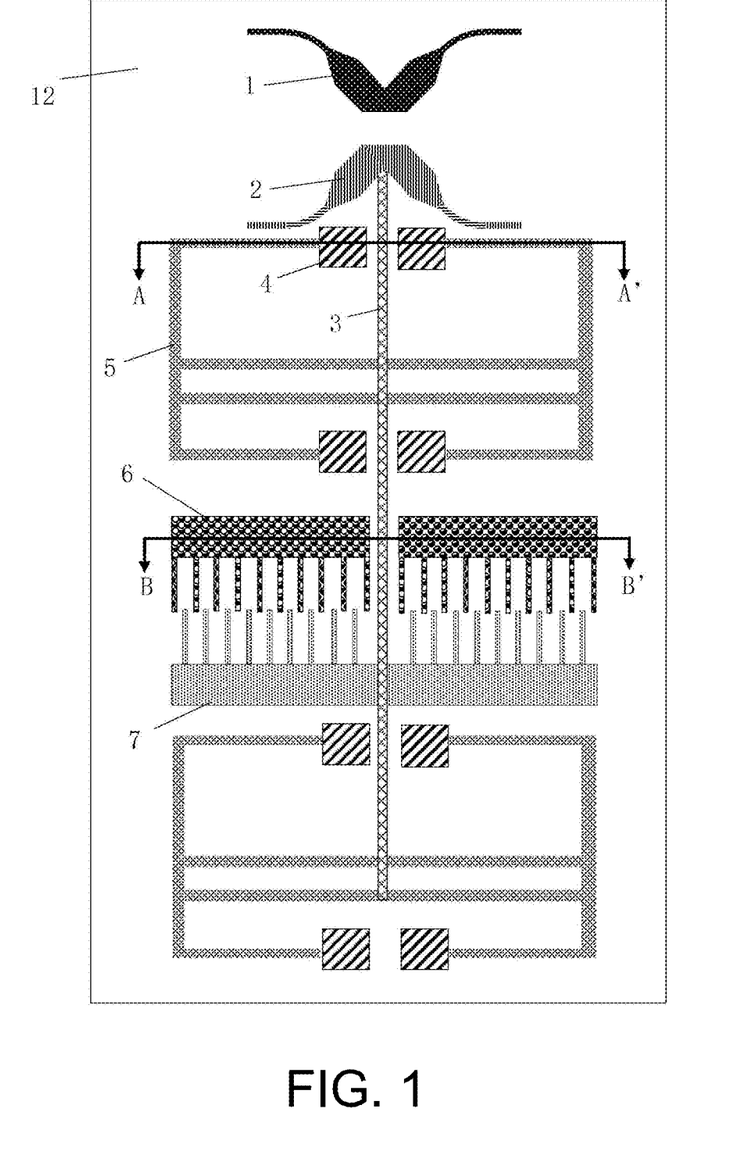
FIG. 1 is a top view of a structure in an initial state (OFF) according to the disclosure.
Figure 5:
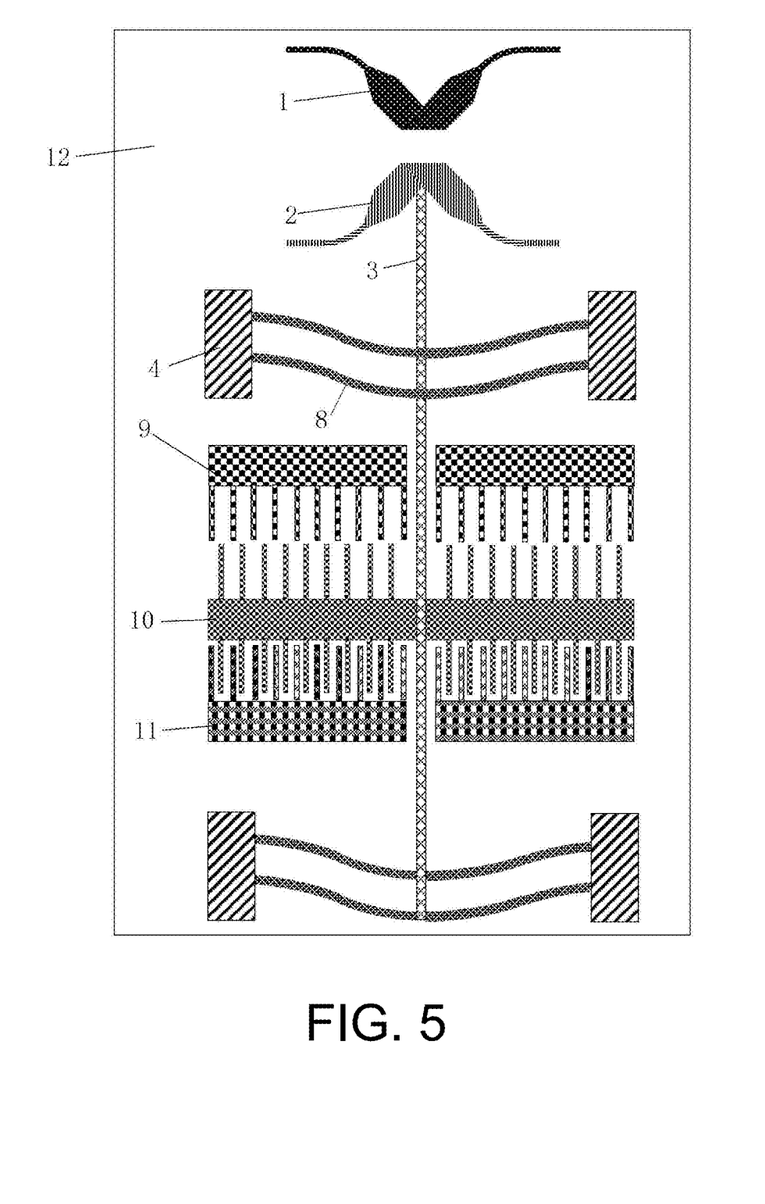
FIG. 5 is a top view of a structure of a bistable optical switch in an state OFF according to the disclosure.

As shown in FIG. 1 and FIG. 5, an optical switch includes a silicon substrate 12 and an electrostatic comb driver and two separated fixed crossing waveguide mirror 1 and movable crossing waveguide mirror 2 placed on the silicon substrate 12. The bottom of the fixed crossing waveguide mirror 1 is fixedly placed on the silicon substrate 12 through a silica under-cladding 13. The bottom of the movable crossing waveguide mirror 2 is suspended on the silicon substrate 12. The movable crossing waveguide mirror 2 is connected to the electrostatic comb driver, and the movable crossing waveguide mirror 2 is driven to move towards or away from the fixed crossing waveguide mirror 1 by the electrostatic comb driver. All structures of a silicon-based MEMS optical switch of the disclosure are symmetrical with a transmission rod 3 as a symmetry axis. The silicon-based MEMS optical switch is a 2×2 optical switch.

The fixed crossing waveguide mirror 1 and the movable crossing waveguide mirror 2 have the same structure and are both primarily constituted by a V-shaped broad waveguide and adiabatic tapered waveguides connected at two ends of the broad waveguide. The width of the broad waveguide is greater than the width of a single-mode waveguide.

The fixed crossing waveguide mirror 1 and the movable crossing waveguide mirror 2 can be docked to form a complete crossing waveguide structure, and a single-mode curved waveguide and a single-mode straight waveguide are sequentially connected to each end of the broad waveguide of the fixed crossing waveguide mirror 1 or the movable crossing waveguide mirror 2, so that adjacent optical switch units are connected, and the single-mode waveguides are used as input and output waveguides.

The electrostatic comb driver is distributed on one side of the movable crossing waveguide mirror 2. By connecting the transmission rod 3 in the electrostatic comb driver to the movable crossing waveguide mirror 2, the movable crossing waveguide mirror 2 is directly pushed by the transmission rod 3 to move to implement positional change.

Embodiment 1

Figure 4:
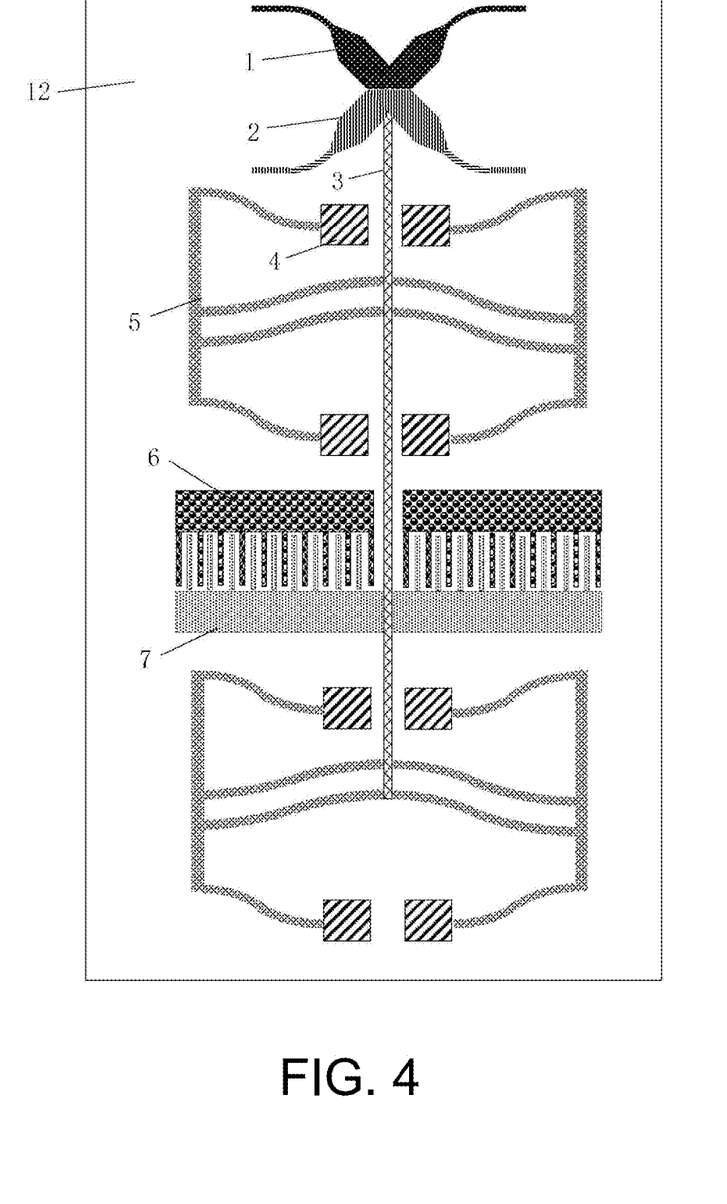
FIG. 4 is a top view of a structure after applying a bias voltage (ON) according to the disclosure.

As shown in FIG. 1 and FIG. 4, an electrostatic comb driver of the embodiment is primarily constituted by a pair of electrostatic comb teeth 6 and 7, a first island spring structure, a second island spring structure, and a transmission rod 3. The transmission rod 3 is arranged along a moving direction of a movable crossing waveguide mirror 2. One end of the transmission rod 3 is fixedly connected to the movable crossing waveguide mirror 2 and is specifically connected to a V-shaped intersection of a broad waveguide of the movable crossing waveguide mirror 2. The transmission rod 3 is perpendicular to a total reflection surface of the movable crossing waveguide mirror 2. The first island spring structure, the pair of electrostatic comb teeth 6 and 7, and the second island spring structure are sequentially disposed from the movable crossing waveguide mirror 2 to the other end of the transmission rod 3.

Figure 2:
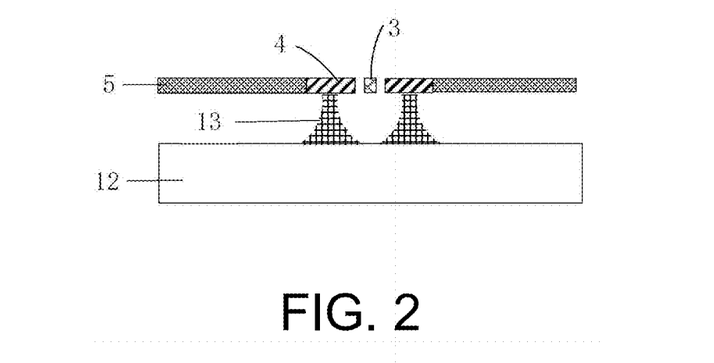
FIG. 2 is an A-A' cross-sectional view of FIG. 1.
Figure 3:
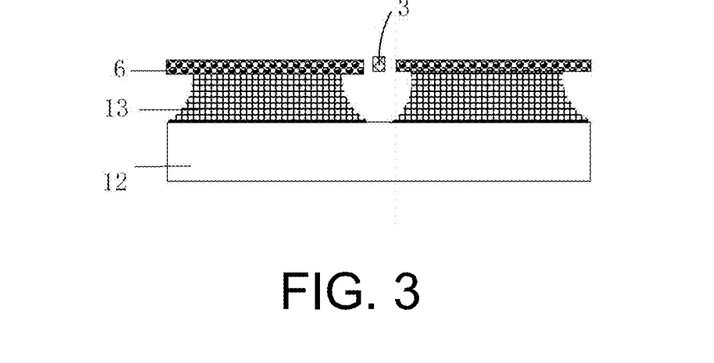
FIG. 3 is a B-B' cross-sectional view of FIG. 1.

The first island spring structure and the second island spring structure have the same structure and both include four fixed islands 4 and two folding springs 5. Two of the four fixed islands 4 form one group to constitute two groups of fixed islands 4, the two groups of fixed islands 4 are symmetrically distributed beside two sides of the transmission rod 3, and the two fixed islands 4 in each group of fixed islands 4 are arranged at intervals along the direction of the transmission rod 3. Spacings between the two fixed islands 4 in each group of fixed islands 4 and the transmission rod 3 are the same. The bottom of the fixed island 4 is fixedly placed on a silicon substrate 12 through a silica under-cladding 13, as shown in FIG. 2. Each side of the two groups of fixed islands 4 is provided with the folding spring 5. Each folding spring 5 is primarily constituted by a main rod and branch arms respectively fixedly connected to two ends and the middle of the main rod. The branch arms at the two ends of the main rod are respectively fixedly connected to side surfaces of the two fixed islands 4 in one group of fixed islands 4, and the branch arm in the middle of the main rod is fixedly connected to a side surface of the transmission rod 3 and is specifically connected to the side surface of the transmission rod 3 between the two fixed islands 4 of the group of fixed islands 4. The bottom of the folding spring 5 is suspended on the silicon substrate 12. The pair of electrostatic comb teeth 6 and 7 are divided into fixed comb teeth 6 and movable comb teeth 7. The fixed comb teeth 6 and the movable comb teeth 7 are equally divided into two parts symmetrically arranged on the two sides of the transmission rod 3. There is a gap without contact connection between the two parts of the fixed comb teeth 6 and the transmission rod 3. The two parts of the movable comb teeth 7 are respectively fixedly connected to two side surfaces of the transmission rod 3. Comb tooth portions of the fixed comb teeth 6 and the movable comb teeth 7 are oppositely arranged and in staggered distribution. The bottom of the fixed comb teeth 6 is fixedly placed on the silicon substrate 12 through the silica under-cladding 13. As shown in FIG. 3, the bottom of the movable comb teeth 7 is suspended on the silicon substrate 12.

The fixed comb teeth 6 are connected to an external circuit, and other parts remain in a grounded state. The optical switch may be regulated through adding or removing a voltage to the fixed comb teeth 6.

The two parts of the fixed comb teeth 6 are both connected to the external circuit, and other parts of the fixed comb teeth 6 including the silicon substrate 12 remain grounded. The external circuit applies a voltage to the fixed comb teeth 6, and the same voltage is applied to the two parts of the fixed comb teeth 6 to drive the movable comb teeth 7 to move towards the fixed comb teeth 6, thereby driving the transmission rod 3 and the movable crossing waveguide mirror 2 connected thereto to move closer to the fixed crossing waveguide mirror 1 until being connected to the fixed crossing waveguide mirror 1, and driving the folding springs 5 in the two island spring structures to flexibly deform.

Through adjusting the magnitude of the voltage applied to the fixed comb teeth 6, the distance that the movable crossing waveguide mirror 2 moves towards the fixed crossing waveguide mirror 1 is regulated, and the distance between the two separated movable crossing waveguide mirror 2 and fixed crossing waveguide mirror 1 is adjusted, thereby implementing functions such as switching a light propagation path or light splitting of a silicon-based MEMS optical switch.

The main rod and the branch arms of the folding spring 5 are all strip-shaped silicon, and the folding spring 5 can be bent and deformed under the push of the transmission rod 3.

Two sides of the electrostatic comb teeth 6 and 7 of the specific implementation are arranged with the fixed islands 4 and the folding springs 5 with the same size along the direction of the transmission rod 3, in order for the electrostatic comb driver to be more stable when working.

In further implementation, the electrostatic comb teeth 6 and 7 have a certain period and duty ratio. The comb teeth of the fixed comb teeth 6 and the movable comb teeth 7 are generally kept consistent in size, but slightly differ in number. The movable comb teeth 7 is connected to the transmission rod 3.

When the silicon-based MEMS optical switch is in a natural state, that is, in a closed initial state OFF, as shown in FIG. 1, there is a spacing between the fixed crossing waveguide mirror 1 and the movable crossing waveguide mirror 2 along the direction of the transmission rod 3, and the spacing may be adjusted to regulate optical properties such as different losses and extinction ratios of the silicon-based MEMS optical switch.

When the silicon-based MEMS optical switch is in the natural state, that is, in the closed initial state OFF, there is a spacing between the pair of electrostatic comb teeth 6 and 7 along the direction of the transmission rod 3, and the spacing is greater than the distance between the fixed crossing waveguide mirror 1 and the movable crossing waveguide mirror 2 to ensure that when the crossing waveguide mirrors 1 and 2 are fitted, as shown in FIG. 4, the two electrostatic comb teeth 6 and 7 do not come into contact.

During the process of switching the silicon-based MEMS optical switch from the closed initial state OFF to an open state ON, the fixed comb teeth 6 is applied with a voltage and is always in a powered state. When the silicon-based MEMS optical switch needs to be switched from the open state ON to the closed initial state OFF, the voltage may be removed from the fixed comb teeth 6.

Embodiment 2

Figure 6:
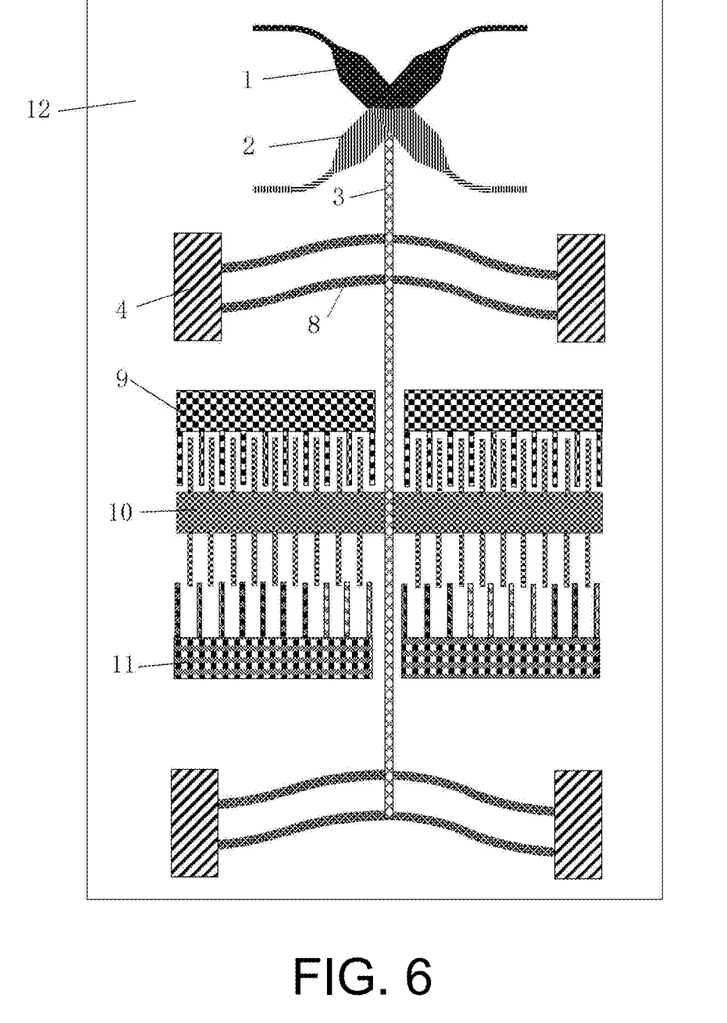
FIG. 6 is a top view of a structure of a bistable optical switch in an state ON according to the disclosure.

As shown in FIG. 5 and FIG. 6, an electrostatic comb driver of the embodiment is a bistable electrostatic comb driver, which is primarily constituted by an electrostatic comb tooth group, a third island spring structure, a fourth island spring structure, and a transmission rod 3. The transmission rod 3 is arranged along a moving direction of a movable crossing waveguide mirror 2. One end of the transmission rod 3 is fixedly connected to the movable crossing waveguide mirror 2 and is specifically connected to a V-shaped intersection of a broad waveguide of the movable crossing waveguide mirror 2. The transmission rod 3 is perpendicular to a total reflection surface of the movable crossing waveguide mirror 2. The third island spring structure, the electrostatic comb tooth group, and the fourth island spring structure are sequentially disposed from the movable crossing waveguide mirror to the other end of the transmission rod. The third island spring structure and the fourth island spring structure have the same structure and both include two fixed islands 2 and bistable springs 8. The two fixed islands 4 are symmetrically distributed on two sides of the transmission rod 3. Spacings between the two fixed islands 4 and the transmission rod 3 are the same. The bottom of the fixed island 4 is fixedly placed on a silicon substrate 12 through a silica under-cladding 13. The two fixed islands 4 are both connected to the transmission rod 3 through the respective bistable springs 8. The bottom of the bistable springs 8 is suspended on the silicon substrate 12.

The electrostatic comb tooth group is divided into first fixed comb teeth 9, bilateral movable comb teeth 10, and second fixed comb teeth 11. The first fixed comb teeth 9, the bilateral movable comb teeth 10, and the second fixed comb teeth 11 are equally divided into two parts symmetrically arranged on the two sides of the transmission rod 3. There is a gap without contact connection between the two parts of the first fixed comb teeth 9 and the second fixed comb teeth 11 and the transmission rod 3. Two parts of the bilateral movable comb teeth 10 are respectively fixedly connected to two side surfaces of the transmission rod 3. The bilateral movable comb teeth 10 is provided with comb tooth structures at two ends along the transmission rod 3. The comb tooth structures at the two ends of the bilateral movable comb teeth 10 are respectively oppositely arranged and in staggered distribution with a comb tooth portion of the first fixed comb teeth 9 and a comb tooth portion of the second fixed comb teeth 11. The bottoms of the first fixed comb teeth 9 and the second fixed comb teeth 11 are both fixedly placed on the silicon substrate 12 through the silica under-cladding 13. The bottom of the bilateral movable comb teeth 10 is suspended on the silicon substrate 12.

The bistable silicon-based MEMS optical switch adopts a bistable electrostatic comb driver, which is different from the electrostatic comb driver in springs and electrostatic combs. A bistable spring 8 constituted by two curved strip-shaped silicon is adopted. Two ends of the strip-shaped silicon are respectively connected to the transmission rod 3 and the fixed island 4.

Two parts of the first fixed comb teeth 9 or the second fixed comb teeth 11 are both connected to the external circuit, and other parts other than the first fixed comb teeth 9 and the second fixed comb teeth 11 including the silicon substrate 12 remain grounded. The external circuit applies a voltage to the first fixed comb teeth 9 or the second fixed comb teeth 11, and the same voltage is applied to the two parts of the first fixed comb teeth 9/second fixed comb teeth 11 to drive the bilateral movable comb teeth 10 to move towards the first fixed comb teeth 9 or the second fixed comb teeth 11, thereby driving the transmission rod 3 and the movable crossing waveguide mirror 2 connected thereto to move closer to the fixed crossing waveguide mirror 1 until being connected to the fixed crossing waveguide mirror 1 or away from the fixed crossing waveguide mirror 1, and driving the bistable springs 8 in the two island spring structures to flexibly deform. In this way, the first fixed comb teeth 9 and the second fixed comb teeth 11 are connected to the external circuit, and when the voltage is applied to one of the same, the bilateral movable comb teeth 10 moves towards the side where the voltage is applied to achieve the objective of switching the state of the optical switch.

Through adjusting the magnitude of the voltage applied to the first fixed comb teeth 9 or the second fixed comb teeth 11, the distance that the movable crossing waveguide mirror 2 moves towards the fixed crossing waveguide mirror 1 is regulated, and the distance between the two separated movable crossing waveguide mirror 2 and fixed crossing waveguide mirror 1 is adjusted, thereby implementing functions such as switching the light propagation path or light splitting of the silicon-based MEMS optical switch.

The bistable spring 8 is primarily constituted by the two curved strip-shaped silicon arranged in parallel. One end of the two strip-shaped silicon is fixedly connected to a side surface of one side of the fixed island 4, and the other end of the two strip-shaped silicon is fixedly connected to a side surface of the transmission rod 3. Deformation can occur under the push of the transmission rod 3.

When the silicon-based MEMS optical switch is in a natural state, that is, in a closed initial state OFF, as shown in FIG. 5, there is a spacing between the fixed crossing waveguide mirror 1 and the movable crossing waveguide mirror 2 along the direction of the transmission rod 3, and the spacing may be adjusted to regulate optical properties such as different losses and extinction ratios of the silicon-based MEMS optical switch.

When the silicon-based MEMS optical switch is in the natural state, that is, in the closed initial state OFF, as shown in FIG. 6, the bistable spring 8 is bent and arranged from the fixed island 4 to the transmission rod 3 towards the side away from the fixed crossing waveguide mirror 1. When the silicon-based MEMS optical switch is in the open state ON, after the fixed crossing waveguide mirror 1 and the movable crossing waveguide mirror 2 are in contact and connected, the bistable spring 8 is bent and arranged from the fixed island 4 to the transmission rod 3 towards the side close to the fixed crossing waveguide mirror 1. Since the bistable spring 8 itself is in a bent state, after switching the state of the optical switch, the own shape can be maintained without adding any external force.

During the process of switching the silicon-based MEMS optical switch from the closed initial state OFF to the open state ON, the first fixed comb teeth 9 is applied with a voltage and is always in a powered state. After the fixed crossing waveguide mirror 1 and the movable crossing waveguide mirror 2 are in contact and connected, and the bistable spring 8 is bent and deformed towards the side close to the fixed crossing waveguide mirror 1, the voltage on the first fixed comb teeth 9 is removed, and the open state of the silicon-based MEMS optical switch is always maintained.

During the process of switching the silicon-based MEMS optical switch from the open state ON to the closed initial state OFF, the second fixed comb teeth 11 is applied with a voltage and is always in a powered state. After the fixed crossing waveguide mirror 1 and the movable crossing waveguide mirror 2 are separated, and the bistable spring 8 is bent and deformed towards the side away from the fixed crossing waveguide mirror 1, the voltage on the second fixed comb teeth 11 is removed, and the closed state of the silicon-based MEMS optical switch is always maintained.

When the first fixed comb teeth 9 switches the state of the optical switch from OFF to ON, a voltage needs to be applied. When the bistable spring 8 is deformed and deformed towards the direction of the crossing waveguide, the voltage can be removed.

Similarly, when the state of the optical switch is switched from ON to OFF, a voltage needs to be applied to the second fixed comb teeth 11, and is removed after the bistable spring 8 is shaped.

The crossing waveguides and other single-mode waveguides of the two embodiments are used for the part of optical transmission. The two crossing waveguide mirrors 1 and 2 are constituted by intersecting broad waveguides and adiabatic tapered waveguides, wherein the fixed crossing waveguide 1 remains stationary, the silica under-cladding 13 under the movable crossing waveguide mirror 2 is completely hollowed out, the same may be butted into a complete crossing waveguide structure, and the crossing angle only needs to meet the condition of total reflection.

The fixed crossing waveguide mirror 1, the movable crossing waveguide mirror 2, and the electrostatic driver all adopt silicon materials with consistent thickness. Regardless of whether the underlying silica under-cladding 13 is corroded, the same remains at the same level.

An intersecting angle between two V-shaped branch parts of the broad waveguides in the movable crossing waveguide mirror 2 and the fixed crossing waveguide mirror 1 satisfies the critical condition of total reflection of mode light from silicon to air.

For the entire optical switch structure, except for the fixed crossing waveguide mirror 1, the fixed island 4, and the fixed comb teeth 6, the rest are suspended and movable, and are supported by being connected to each fixed island 4. The fixed crossing waveguide mirror 1, the fixed island 4, and the fixed comb teeth 6 as fixed part are connected to the silicon substrate 12 through the silica under-cladding 13, and the rest of the electrostatic comb driver and the movable crossing waveguide mirror 2 are all used as movable parts. The silica under-cladding 13 is corroded by adopting corrosive gas such as hydrogen fluoride, as shown in FIG. 2 and FIG. 3, to form a cantilever beam structure.

In the specific implementation, all waveguides and electrostatic comb drivers are made of the same material and may be manufactured by adopting monolithic integration. The crossing waveguide has four ports. According to different application scenarios, different topological structures are adopted. Through cascading more optical switch units, an N×N optical switch array with more ports may be obtained.

Figure 7:
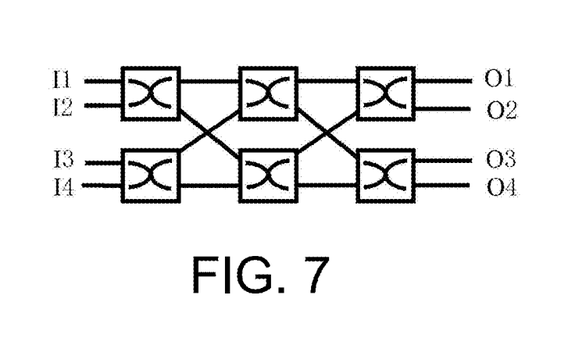
FIG. 7 is a schematic view of a Benes topology forming an optical switch array according to the disclosure.

FIG. 7 shows a 4×4 optical switch array adopting a Benes topology. The 4×4 optical switch array includes six 2×2 optical switches. Taking two 2×2 optical switches as one group, the six 2×2 optical switches are divided into two groups. Multiple 2×2 optical switch groups are sequentially connected in series. One of the respective output waveguides of the two 2×2 optical switches in the former group of 2×2 optical switches is respectively connected to one of the respective input waveguides of the two 2×2 optical switches in the latter group of 2×2 optical switches. The other one of the respective output waveguides of the two 2×2 optical switches in the former group of 2×2 optical switches are respectively connected to two ends of one side of a crossing waveguide. The other one of the respective output waveguides of the two 2×2 optical switches in the latter group of 2×2 optical switches are respectively connected to two ends of the other side of the crossing waveguide.

The working process of the optical switch array of the disclosure is as follows.

According to the principle of total reflection of light, when light is transmitted from an optically denser medium to an optically sparser medium, total reflection occurs when an incident angle is greater than a critical value, and light is no longer incident to the optically sparser medium. Taking silicon as an example, a critical angle of total reflection of light from a silicon wave guide to air is about 17°. As shown in FIG. 1, as long as an included angle between two crossing waveguides is greater than or equal to 34°, the condition of total reflection can be met. Since light is totally reflected inside the separated crossing waveguides, which changes the transmission direction of light at a mirror surface like a reflective mirror, the same are referred to as "crossing waveguide mirrors".

FIG. 1 and FIG. 4 are combined to show two states of the silicon-based MEMS optical switch.

Firstly, in FIG. 1, no voltage is applied to the structure, the optical switch is in the state OFF, and a relatively long distance is maintained between the fixed comb teeth and the movable comb teeth and between the crossing waveguide mirrors. In such a state, the incident light is incident from a single-mode straight waveguide on the left. After passing through the single-mode curved waveguide, light is totally reflected at the V-shaped branch part, and the transmission direction is changed. Then, light is output via the single-mode curved waveguide and the single-mode straight waveguide on the right. A certain voltage is applied to the fixed comb teeth, and a similar capacitance is formed between the fixed comb teeth and the movable comb teeth. Under the action of electrostatic force, the movable comb teeth move towards the fixed comb teeth, and the transmission rod moves towards the fixed crossing waveguide mirror and pulls one end of the folding spring to deform the folding spring. When a deformation stress generated by the deformation of the folding spring is equal to the electrostatic force between the electrostatic comb teeth, the electrostatic comb driver reaches equilibrium. The greater the applied voltage value, the greater the electrostatic force, the greater the deformation generated by the folding spring during equilibrium, and the greater the distance the movable crossing waveguide mirror moves.

When the two crossing waveguide mirrors are exactly fitted, the optical switch is in the state ON, as shown in FIG. 4. At this time, the two waveguide mirrors may be regarded as a whole, the incident light incident to the V-shaped part is not totally reflected and continues to be propagated forward, and the transmission direction does not change. If the state OFF is to be restored, the voltage applied to the fixed comb teeth is removed, there is no electrostatic force between the electrostatic comb teeth, the folding spring no longer maintains the bent state and rebounds to the original shape, and the transmission rod pulls the movable crossing waveguide mirror back to the original position. In this way, the free switching between the two states of the optical switch is completed.

Compared with FIG. 1 and FIG. 4, the bistable state of FIG. 5 and FIG. 6 is embodied in the bistable spring of the electrostatic comb. The bistable spring adopts two identical strip-shaped silicon, and the initial shape is bent. When no voltage is applied, that is, the state OFF, the bilateral movable comb teeth is close to the second fixed comb teeth, and the crossing waveguides are in a separated state. When a certain voltage is applied to the fixed comb teeth, the bilateral movable comb teeth moves towards the fixed comb teeth under the action of electrostatic force, and the bistable spring is bent towards the direction opposite to the initial shape. After bending to a certain extent, the voltage is removed, the bistable spring does not rebound, and the state ON is maintained. If the optical switch is to be switched to the state OFF, a little voltage may be added to the second fixed comb teeth, and is removed after deformation is completed. Since the whole process only needs to apply a voltage when switching the state, the voltage may be removed after the bistable spring is stable, and no long-term powering is required, the optical switch may implement the effect of low energy consumption.

An electrostatic comb drive-based silicon-based MEMS optical switch is a 2×2 optical switch, which is more scalable than a previous 1×2 silicon-based MEMS optical switch and may adopt a more optimized topological structure of the N×N optical switch array. In fact, in order to implement an array structure of the N×N optical switch, the previous 1×2 silicon-based MEMS optical switch can usually only adopt a cross-bar topology, and the number of optical switch units required is as high as $N^2$. The 2×2 silicon-based MEMS optical switch may adopt a more optimized and simpler Benes topology, as shown in FIG. 7, and only needs $N(\log_2 N-0.5)$ optical switch units. Of course, the disclosure is not limited to the Benes topology, and other topological structures are also suitable.

The specific implementation of a test situation of the disclosure is given below as follows.

A 2×2 unit optical switch is taken as an example, as shown in FIG. 1.

A silicon nanowire optical waveguide based on a silicon-on-insulator (SOI) material is selected. The core layer material is silicon with a thickness of 220 nm and a refractive index of 3.4744. The under-cladding material is silicon dioxide with a thickness of 2 μm and a refractive index of 1.4404. The upper-cladding material is air with a refractive index of approximately 1. Considering that the incident wavelength range is 1250 to 1650 nm, a TE polarization mode is adopted.

According to the principle of total reflection, the critical angle of total reflection at a silicon-air interface is about 17°. The crossing waveguide shown in FIG. 1 is 90°, which may easily adopt a cross-bar structure to form an array, and may also be similar to a 2×2 MZI optical switch through adding four 45° curved single-mode waveguides. Therefore, the array may be formed by adopting a topological structure, such as Benes. The parameters of the separated crossing waveguide mirrors are as follows. The width of the single-mode waveguide is 0.5 μm, the width of the broad waveguide is 2.53 μm, the length of the adiabatic tapered waveguide is 8.12 μm, the width of the broad waveguide is 7.18 μm, and the spacing of the crossing waveguides is 500 nm.

Figure 8:
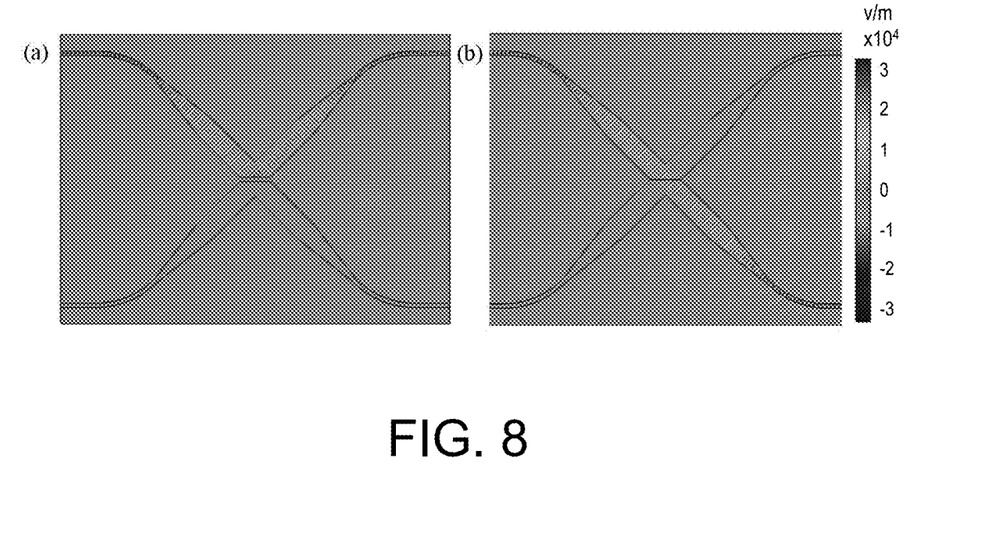
FIG. 8 shows diagrams of light field transmission in OFF and state ONs according to the disclosure.

The optical performance of the crossing waveguide mirror is simulated and verified by a three-dimensional finite differential method in the time domain to obtain that in the initial state (OFF), the incident light field is almost perfectly reflected by the crossing waveguide mirror to a straight-through end, as shown in (a) of FIG. 8. Low loss and high extinction ratio can be implemented in the waveband of 1250 to 1650 nm, the loss is 0.09 to 0.43 dB, the extinction ratio is 36 to 60 dB, the loss at the center wavelength of 1450 nm is 0.12 dB, and the extinction ratio is 58.02 dB. A voltage is applied to the fixed comb teeth. The movable comb teeth push the movable crossing waveguide mirror to move towards the fixed crossing waveguide mirror through the transmission rod. The incident light field after the two are fitted may be transmitted to a crossing end almost without loss, as shown in (b) of FIG. 8. The state ON of the optical switch can also obtain good performance in the waveband of 1250 to 1650 nm, the loss is 0.08 to 0.4 dB, the extinction ratio is greater than 53 dB, the loss at the center wavelength of 1450 nm is 0.13 dB, and the extinction ratio is 44.25 dB. It can be seen that the new 2×2 silicon-based MEMS optical switch proposed by the disclosure can achieve effects such as ultra-large bandwidth, ultra-low loss, high extinction ratio, and ultra-low energy consumption.

The foregoing embodiments are used to explain the disclosure, rather than limit the disclosure. Within the spirit of the disclosure and the protection scope of the claims, any modifications and changes made to the disclosure should fall within the protection scope of the disclosure.

What is claimed is:

1. An electrostatic comb drive-based silicon-based MEMS optical switch, comprising: a silicon substrate and an electrostatic comb driver and a fixed crossing waveguide mirror and a movable crossing waveguide mirror separated from each other and placed on the silicon substrate, wherein a bottom of the fixed crossing waveguide mirror is fixedly placed on the silicon substrate through a silica under-cladding, the movable crossing waveguide mirror is connected to the electrostatic comb driver, and the movable crossing waveguide mirror is driven by the electrostatic comb driver to move towards or away from the fixed crossing waveguide mirror.

2. The electrostatic comb drive-based silicon-based MEMS optical switch according to claim 1, wherein the fixed crossing waveguide mirror and the movable crossing waveguide mirror have the same structure, which are both constituted by a V-shaped broad waveguide and adiabatic tapered waveguides connected at two ends of the broad waveguide.

3. The electrostatic comb drive-based silicon-based MEMS optical switch according to claim 1, wherein an intersecting angle between two branch parts of V-shaped broad waveguides in the movable crossing waveguide mirror and the fixed crossing waveguide mirror satisfies a critical condition of total reflection of mode light on a silicon-air interface.

4. The electrostatic comb drive-based silicon-based MEMS optical switch according to claim 1, wherein the fixed crossing waveguide mirror and the movable crossing waveguide mirror are docked to form a complete crossing waveguide structure, and a single-mode curved waveguide and a single-mode straight waveguide are sequentially connected to each end of a broad waveguide of the fixed crossing waveguide mirror or the movable crossing waveguide mirror, so that adjacent optical switch units are connected, and the single-mode waveguides are used as input and output waveguides.

5. The electrostatic comb drive-based silicon-based MEMS optical switch according to claim 1, wherein the electrostatic comb drive is constituted by a pair of electrostatic comb teeth, a first island spring structure, a second island spring structure, and a transmission rod;
   the transmission rod is arranged along a moving direction of the movable crossing waveguide mirror, one end of the transmission rod is fixedly connected to the movable crossing waveguide mirror, and the first island spring structure, the pair of electrostatic comb teeth, and the second island spring structure are sequentially disposed from the movable crossing waveguide mirror to another end of the transmission rod;
   the first island spring structure and the second island spring structure have a same structure, which are both comprise four fixed islands and two folding springs, and two of the four fixed islands form one group to constitute two groups of the fixed islands, the two groups of the fixed islands are symmetrically distributed beside two sides of the transmission rod, the two fixed islands in each group of the fixed islands are spaced apart along a direction of the transmission rod, and a bottom of the fixed island is fixedly placed on the silicon substrate through the silica under-cladding;

each side of the two groups of the fixed islands is provided with a folding spring, each folding spring is constituted by a main rod and branch arms respectively fixedly connected to two ends and a middle of the main rod, the branch arms at the two ends of the main rod are respectively fixedly connected to side surfaces of the two fixed islands in one group of the fixed islands, and the branch arm in the middle of the main rod is fixedly connected to a side surface of the transmission rod;

the pair of electrostatic comb teeth are divided into fixed comb teeth and movable comb teeth, the fixed comb teeth and the movable comb teeth are equally divided into two parts symmetrically arranged on the two sides of the transmission rod, there is a gap without contact connection between the two parts of the fixed comb teeth and the transmission rod, the two parts of the movable comb teeth are respectively fixedly connected to two side surfaces of the transmission rod, and comb tooth portions of the fixed comb teeth and the movable comb teeth are oppositely arranged and in staggered distribution; and a bottom of the fixed comb teeth is fixedly placed on the silicon substrate through the silica under-cladding.

6. The electrostatic comb drive-based silicon-based MEMS optical switch according to claim 5, wherein the two parts of the fixed comb teeth are both connected to an external circuit, the external circuit applies a voltage to the fixed comb teeth to drive the movable comb teeth to move towards the fixed comb teeth, thereby driving the transmission rod and the movable crossing waveguide mirror connected thereto to move closer to the fixed crossing waveguide mirror until being connected to the fixed crossing waveguide mirror, and driving folding springs in two island spring structures to flexibly deform.

7. The electrostatic comb drive-based silicon-based MEMS optical switch according to claim 1, wherein the electrostatic comb driver is a bistable electrostatic comb driver and is primarily constituted by an electrostatic comb tooth group, a third island spring structure, a fourth island spring structure, and a transmission rod; the transmission rod is arranged along a moving direction of the movable crossing waveguide mirror, one end of the transmission rod is fixedly connected to the movable crossing waveguide mirror, and the third island spring structure, the electrostatic comb tooth group, and the fourth island spring structure are sequentially disposed from the movable crossing waveguide mirror to another end of the transmission rod;

the third island spring structure and the fourth island spring structure have a same structure, which are both comprise two fixed islands and a bistable spring, the two fixed islands are symmetrically distributed on two sides of the transmission rod, a bottom of the fixed island is fixedly placed on the silicon substrate through the silica under-cladding, and the two fixed islands are both connected to the transmission rod through the respective bistable springs;

the electrostatic comb tooth group is divided into a first fixed comb teeth, a bilateral movable comb teeth, and a second fixed comb teeth, the first fixed comb teeth, the bilateral movable comb teeth, and the second fixed comb teeth are equally divided into two parts symmetrically arranged on two sides of the transmission rod, there is a gap without contact connection between the two parts of the first fixed comb teeth and the second fixed comb teeth and the transmission rod, the two parts of the bilateral movable comb teeth are respectively fixedly connected to two side surfaces of the transmission rod, the bilateral movable comb teeth is provided with comb tooth structures at two ends along the transmission rod, and the comb tooth structures at the two ends of the bilateral movable comb teeth are respectively oppositely arranged and in staggered distribution with a comb tooth portion of the first fixed comb teeth and a comb tooth portion of the second fixed comb teeth; and bottoms of the first fixed comb teeth and the second fixed comb teeth are both fixedly placed on the silicon substrate through the silica under-cladding.

8. The electrostatic comb drive-based silicon-based MEMS optical switch according to claim 7, wherein the two parts of the first fixed comb teeth or the second fixed comb teeth are both connected to an external circuit, the external circuit applies a voltage to the first fixed comb teeth or the second fixed comb teeth to drive the bilateral movable comb teeth to move towards the first fixed comb teeth or the second fixed comb teeth, thereby driving the transmission rod and the movable crossing waveguide mirror connected thereto to move closer to the fixed crossing waveguide mirror until being connected to the fixed crossing waveguide mirror, and driving bistable springs in two island spring structures to flexibly deform.

9. The electrostatic comb drive-based silicon-based MEMS optical switch according to claim 7, wherein a voltage is applied to one of the first fixed comb teeth and the second fixed comb teeth, through adjusting a magnitude of the voltage, a distance that the movable crossing waveguide mirror moves towards the fixed crossing waveguide mirror is regulated, and a distance between the movable crossing waveguide mirror and the fixed crossing waveguide mirror is adjusted, thereby implementing functions of switching a light propagation path or light splitting of the silicon-based MEMS optical switch.

10. An N×N silicon-based MEMS optical switch array, wherein:

the N×N optical switch array comprises at least four cascaded silicon-based MEMS optical switches according to claim 1.

* * * * *